(12) United States Patent
Parker et al.

(10) Patent No.: US 12,371,167 B2
(45) Date of Patent: Jul. 29, 2025

(54) MOVABLE RAIL ASSEMBLY FOR A PASSENGER SEAT

(71) Applicant: Safran Seats USA LLC, Gainesville, TX (US)

(72) Inventors: Charles Michael Parker, Irvine, CA (US); Foek Nguyen Le, Arlington, TX (US); Amen Omoragbon, Westminster, CA (US)

(73) Assignee: Safran Seats USA LLC, Gainesville, TX (US)

( * ) Notice: Subject to any disclaimer, the term of this patent is extended or adjusted under 35 U.S.C. 154(b) by 215 days.

(21) Appl. No.: 18/274,878

(22) PCT Filed: Feb. 10, 2021

(86) PCT No.: PCT/US2021/017489
§ 371 (c)(1),
(2) Date: Jul. 28, 2023

(87) PCT Pub. No.: WO2022/173433
PCT Pub. Date: Aug. 18, 2022

(65) Prior Publication Data
US 2024/0083584 A1 Mar. 14, 2024

(51) Int. Cl.
*B64D 11/06* (2006.01)
*B64D 11/00* (2006.01)

(52) U.S. Cl.
CPC .... *B64D 11/0642* (2014.12); *B64D 11/00151* (2014.12)

(58) Field of Classification Search
CPC .......................... B64D 11/00151; B60N 2/821
See application file for complete search history.

(56) References Cited

U.S. PATENT DOCUMENTS 4,545,618 A * 10/1985 Kitamura ............... B60N 2/818
297/391
5,860,703 A * 1/1999 Courtois ................ B60N 2/818
297/410

(Continued)

FOREIGN PATENT DOCUMENTS

CN          109532600 A      3/2019
DE      102005006116 A1      5/2006
(Continued)

OTHER PUBLICATIONS

International Patent Application No. PCT/US2021/017489, International Search Report and Written Opinion, dated Nov. 4, 2021.
(Continued)

*Primary Examiner* — Philip F Gabler
(74) *Attorney, Agent, or Firm* — Kilpatrick Townsend & Stockton LLP

(57) ABSTRACT

A rail assembly includes assembly includes a fixed carriage and a clamping system. The fixed carriage defines a receiving area and a rail at least partially supported within the receiving area. The rail is slidable along an axis relative to the receiving area. The clamping system applies a clamping force on the rail within the receiving area. A movable assembly may be supported on the rail such that the movable assembly is movable along the axis relative to the fixed carriage.

18 Claims, 7 Drawing Sheets

(56) References Cited

U.S. PATENT DOCUMENTS

| | | | | |
|---|---|---|---|---|
| 7,407,231 | B2* | 8/2008 | Kraft | B60N 2/821 |
| | | | | 297/410 |
| 7,758,115 | B2* | 7/2010 | Yamaguchi | B60N 2/888 |
| | | | | 297/216.12 |
| 9,260,043 | B2* | 2/2016 | Robert | B60N 2/865 |
| 9,902,335 | B2* | 2/2018 | Krikorian | B60N 3/004 |
| 10,351,032 | B2* | 7/2019 | Wehling | B60N 2/806 |
| 11,225,179 | B2* | 1/2022 | Wehling | B60N 2/897 |
| 2015/0239377 | A1* | 8/2015 | Winkelbach | B60N 2/80 |
| | | | | 297/391 |
| 2016/0176356 | A1* | 6/2016 | Krikorian | B60R 11/02 |
| | | | | 224/275 |
| 2017/0043876 | A1 | 2/2017 | Oleson et al. | |
| 2019/0283641 | A1* | 9/2019 | Wehling | B60N 2/809 |
| 2020/0298739 | A1* | 9/2020 | Hosmani | B64D 11/0642 |

FOREIGN PATENT DOCUMENTS

| | | |
|---|---|---|
| DE | 102007059371 A1 | 6/2009 |
| IT | AN20110172 A1 | 6/2013 |
| WO | 2020068061 A1 | 4/2020 |

OTHER PUBLICATIONS

European Application No. 21709596.7, Office Action mailed on Jan. 24, 2025, 7 pages.

* cited by examiner

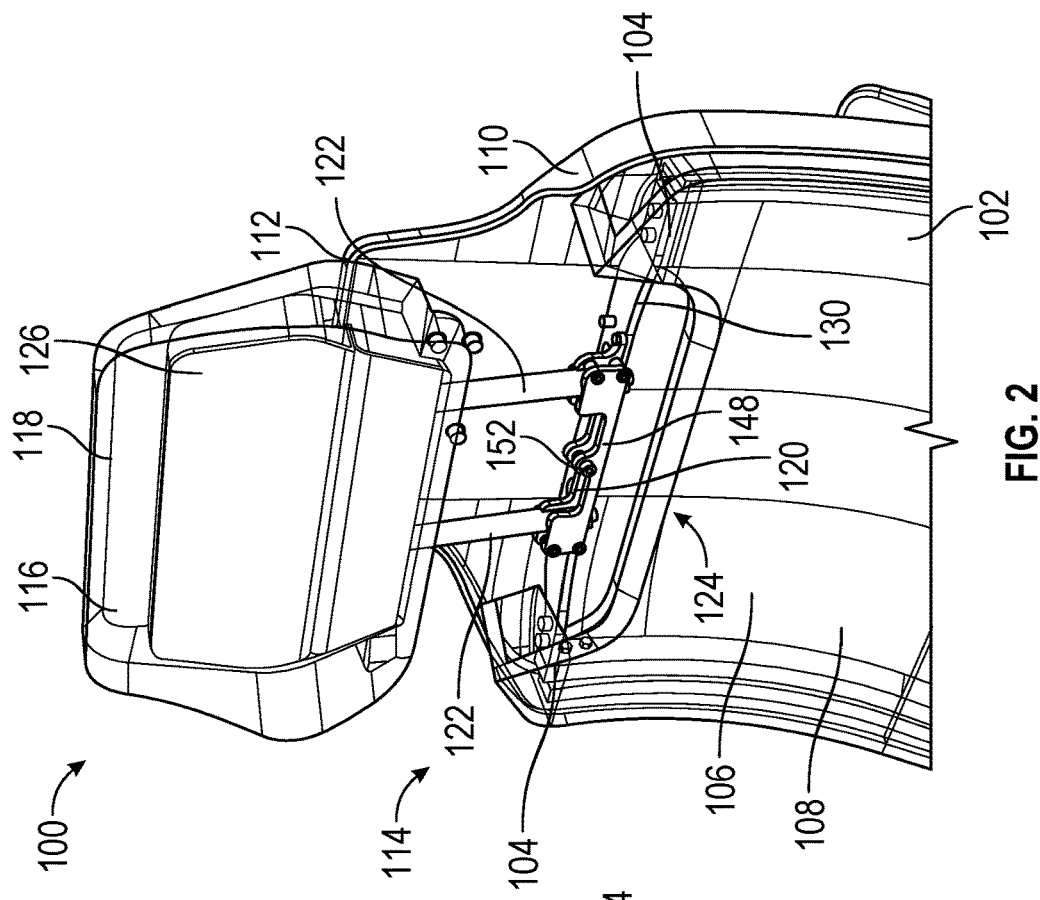
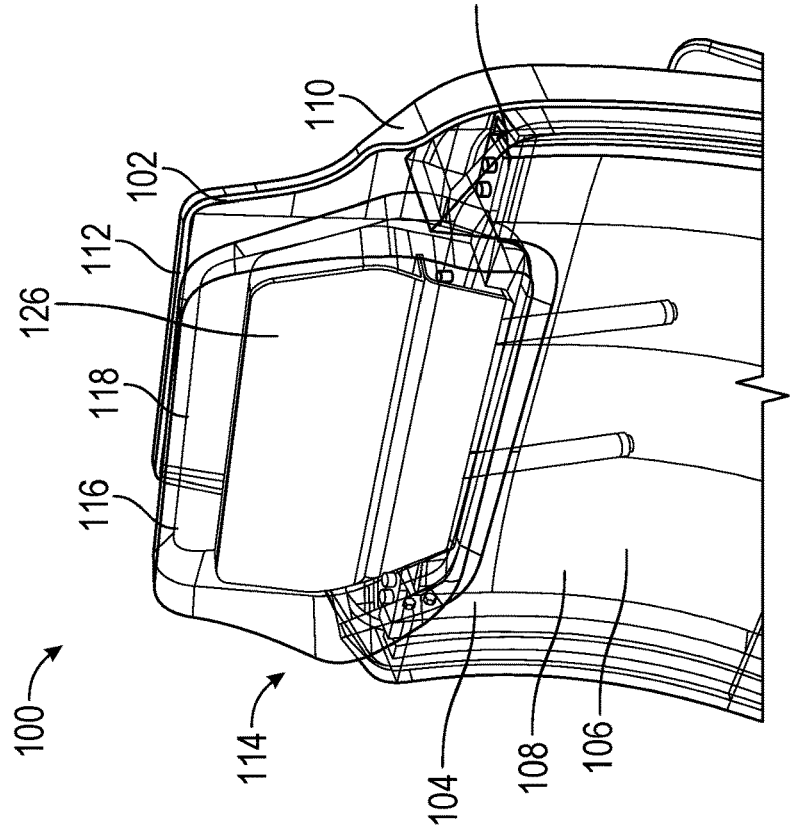

MOVABLE RAIL ASSEMBLY FOR A PASSENGER SEAT

FIELD OF THE INVENTION

The field of the invention relates to passenger seats, and, more particularly, to movable carriage assemblies for passenger seats.

BACKGROUND

Passenger vehicles, such as aircraft, buses, trains, ships, and automobiles, include passenger seats in which passengers can be seated and otherwise use during travel. A passenger seat may sometimes include a linear movement mechanism that supports a carriage or component or structure on the passenger seat. As one example, a headrest of a passenger seat may be supported on a linear movement mechanism. Typically, the linear movement mechanism is attached to a rigid diaphragm of the seat back of the passenger seat, which constrains the maximum headrest travel and maximum headrest height and makes then unusable for taller passengers without increasing the seat back height (which is restricted by aircraft guidelines). Existing linear movement mechanisms also only allow for adjustment of the alignment of the carriage relative to the seat back and are not suitable for other movable assemblies that may exist on aircraft seats such as vertical sliding screens and meal tables. Finally, existing linear movement mechanisms are not suitable for passenger seats that do not have hard structure diaphragms.

SUMMARY

The terms "invention," "the invention," "this invention" and "the present invention" used in this patent are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various aspects of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

According to certain embodiments of the present invention, a passenger seat assembly includes a movable assembly and a rail assembly. The rail assembly includes a fixed carriage defining a receiving area and a rail at least partially supported within the receiving area. The rail is slidable along an axis relative to the receiving area. The rail assembly also includes a clamping system that applies a clamping force on the rail within the receiving area. The movable assembly is supported on the rail such that the movable assembly is movable along the axis relative to the fixed carriage.

In some embodiments, the movable assembly includes a headrest or an in-flight entertainment system support. In various embodiments, the clamping system includes a damper and at least one biasing mechanism. The damper may at least partially cover the receiving area of the fixed carriage, and the at least one biasing mechanism may be between the damper and the fixed carriage and biasing the damper away from the fixed carriage.

In various embodiments, the clamping system includes a damper at least partially covering the receiving area of the fixed carriage, and a clamp adjuster connecting the damper with the fixed carriage and that is adjustable such that the clamping force is adjustable. In some cases, the receiving area is a first receiving area and the rail is a first rail, the fixed carriage includes a second receiving area, and the rail assembly includes a second rail partially supported within the second receiving area and slidable along an axis relative to the second receiving area. The damper may at least partially cover the first rail in the first receiving area and the second rail in the second receiving area. In certain embodiments, the clamp adjuster is between the first receiving area and the second receiving area.

The rail may include a reinforcement rail and a sleeve surrounding the reinforcement rail, and the clamping system may be configured to engage the sleeve. In various embodiments, the rail assembly includes stops on opposing ends of the rail.

According to certain embodiments of the present invention, a passenger seat assembly includes a base structure and a rail assembly. The rail assembly includes a carriage, a rail, and a clamping system. The carriage is fixed to the base structure and defines a receiving area. The rail includes a first end and a second end opposite from the first end. At least a portion of the rail between the first end and the second end is within the receiving area, and the rail is movable along an axis of the receiving area such that a position of the first end and the second end along the axis and relative to the carriage is adjustable. The clamping system is configured to apply a clamping force on the portion of the rail within the receiving area.

In some embodiments, the base structure includes at least one of a seat diaphragm, a seat shell, or a seat frame. The passenger seat assembly may include a movable assembly supported by the rail of the rail assembly, wherein the movable assembly comprises at least one of a headrest or an in-flight entertainment system support.

In various embodiments, the receiving area is a first receiving area and the rail is a first rail, and the rail assembly further includes a second receiving area defined by the carriage and a second rail having a first end and a second end opposite from the first end. In some cases, at least a portion of the second rail between the first end and the second end is within the second receiving area, and the second the rail is movable along an axis of the receiving area such that a position of the first end and the second end along the axis and relative to the carriage is adjustable. The clamping system may be configured to apply a clamping force on the portion of the second rail within the second receiving area.

In various embodiments, the passenger seat assembly includes a damper at least partially covering the first receiving area and the second receiving area. The passenger seat assembly may also include a clamp adjuster connecting the damper with the carriage between the first receiving area and the second receiving area. The clamp adjuster may be adjustable such that the clamping force is adjustable.

In some embodiments, the clamping system may include a clamper at least partially covering the receiving area of the carriage, a biasing member between the damper and the carriage, and a clamp adjuster connecting the damper with the carriage. The clamp adjuster may be adjustable such that the clamping force is adjustable.

According to certain embodiments of the present invention, a passenger seat assembly includes a rail assembly that is configured to move a movable assembly relative to a base structure. The rail assembly includes a carriage defining a receiving area, a rail, and a clamping system. The rail includes a first end and a second end opposite from the first end, at least a portion of the rail between the first end and the second end is within the receiving area, and the rail is movable along an axis of the receiving area such that a position of the first end and the second end along the axis and relative to the carriage is adjustable. The clamping system is configured to apply a clamping force on the portion of the rail within the receiving area. The clamping system may include a damper at least partially covering the rail in the receiving area, and a clamp adjuster connecting the damper with the carriage. The clamp adjuster may be adjustable such that the clamping force is adjustable.

In some embodiments, the passenger seat assembly includes the base structure and the movable assembly. The carriage may be fixed on the base structure, and the rail may support the movable assembly such that the movable assembly is movable relative to the base structure. In certain cases, the base structure includes at least one of a seat diaphragm, a seat shell, or a seat frame, and the movable assembly includes at least one of a headrest or an in-flight entertainment system support.

In various embodiments, the rail assembly includes at least one biasing member between the damper and the carriage that biases the damper away from the carriage. In some embodiments, the rail includes a reinforcement rail and a sleeve surrounding the reinforcement rail, and the clamping system may be configured to engage the sleeve.

In some cases, the receiving area is a first receiving area and the rail is a first rail, and the rail assembly further includes a second receiving area defined by the carriage and a second rail having a first end and a second end opposite from the first end. In these embodiments, at least a portion of the second rail between the first end and the second end may be within the second receiving area, and the second rail may be movable along an axis of the receiving area such that a position of the first end and the second end along the axis and relative to the carriage is adjustable. The clamping system may be configured to apply a clamping force on the portion of the second rail within the second receiving area. In certain embodiments, the clamp adjuster is between the first receiving area and the second receiving area.

Various implementations described in the present disclosure can include additional systems, methods, features, and advantages, which cannot necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims.

BRIEF DESCRIPTION OF THE DRAWINGS

FIG. 1 is a perspective view of a portion of a passenger seat assembly with a rail assembly according to certain embodiments of the present invention.

FIG. 2 is another perspective view of the passenger seat assembly of FIG. 1 with the rail assembly in a deployed position.

DETAILED DESCRIPTION

Figure 3:
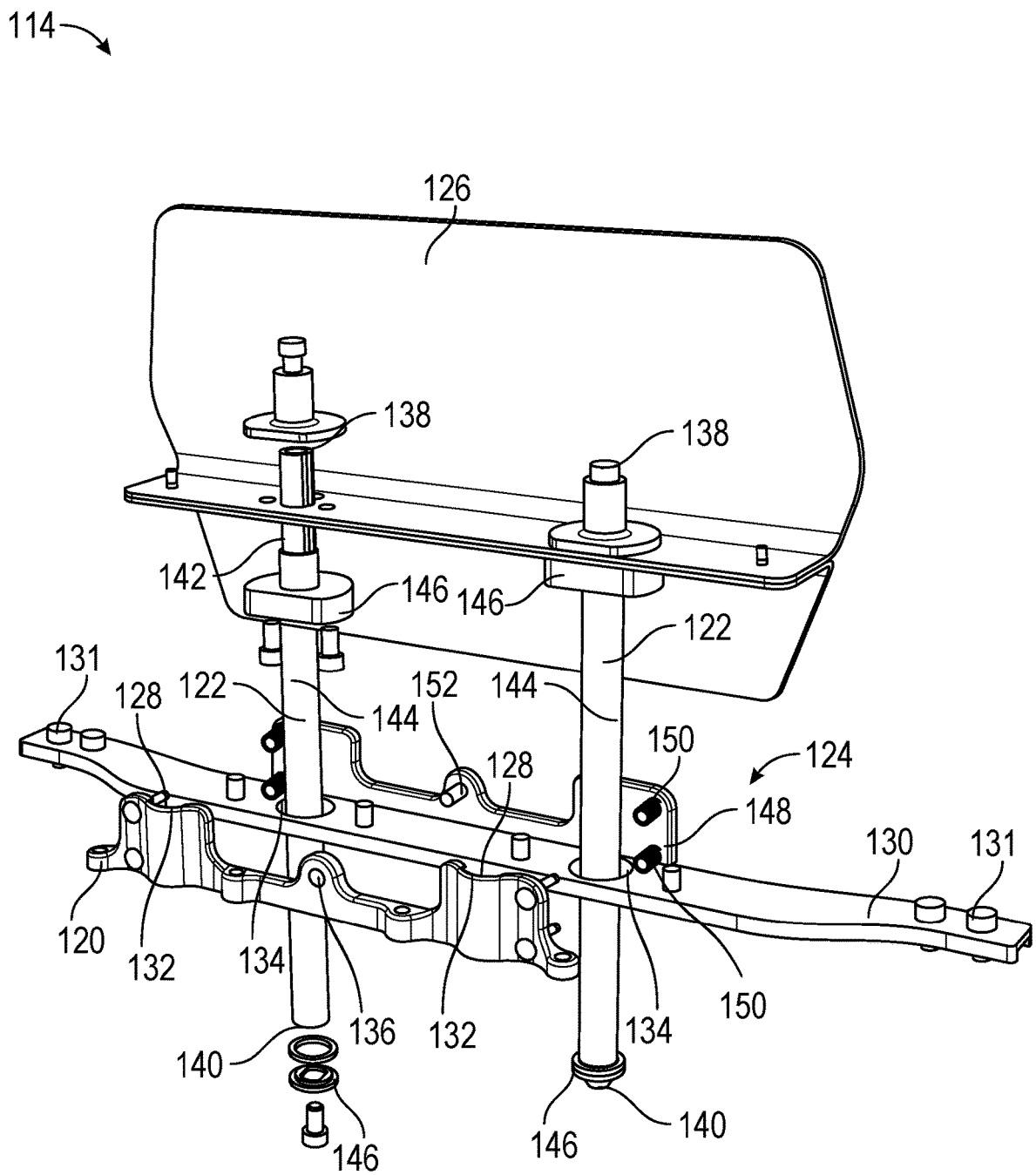
FIG. 3 is a perspective view of the rail assembly of FIG. 1.

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described. Directional references such as "up," "down," "top," "bottom," "left," "right," "forward," and "aft," among others, are intended to refer to the orientation as illustrated and described in the figure (or figures) to which the components and directions are referencing but are not intended to imply any particular installation orientation.

The described embodiments of the invention provide rail assemblies for passenger seat assemblies. While the rail assemblies are discussed for use with aircraft seats, they are by no means so limited. Rather, embodiments of the rail assemblies may be used in passenger seats or other seats of any type or otherwise as desired.

The rail assemblies described herein may support a movable assembly (e.g., a headrest, meal table, in-flight entertainment screen, etc.) while providing a maximum travel length and maximum height that are independent from a length and height of a mounting surface. In certain embodiments, the rail assemblies described herein may allow for smooth travel along its travel length while minimizing or eliminating binding. In some cases, the rail assemblies described herein may allow for adjustment of friction such that the frictional engagement between the components of the rail assemblies can be tailored to various applications such as headrests, sliding in-flight entertainment (IFE) screens, sliding meal tables, etc. In certain aspects, the compact size of the rail assembly allows the rail assembly to be mounted to diaphragms, shells, frames, other rigid surfaces, and/or other locations on a passenger seat as desired, thereby providing a versatile sliding system that is not constrained by the height or length of the mounting surface. Various other benefits and improvements may be realized with the rail assemblies described herein, and the aforementioned examples should not be considered limiting.

As illustrated in FIG. 1, a passenger seat assembly 100 may include one or more seat backs 102 and, while not shown, include one or more seat bases. The number of seat bases and/or seat backs 102 should not be considered limiting on the current disclosure. In various examples, the number of seat backs 102 correspond with the number of passengers that the passenger seat is capable of carrying. In the example of FIG. 1, the passenger seat assembly 100 is capable of carrying one passenger, and accordingly has one seat back 102. However, in other examples, the passenger seat assembly 100 may be capable of carrying any desired number of passengers, such as one passenger, two passengers, three passengers, four passengers, or any other desired number of passengers. In these examples, the passenger seat assembly 100 can likewise have any desired number of corresponding seat backs 102.

The seat back 102 may include a seat frame 104, a seat diaphragm 106 supported by the seat frame 104 to form a seating surface 108, and optionally includes a seat shell 110. As illustrated in FIGS. 1 and 2, the seat back 102 defines a top end 112 of the passenger seat assembly 100. In certain aspects, at least the seat frame 104 may be a rigid supportive structure. The seat shell 110 (when included) and/or the seat diaphragm 106, may, but do not have to be, rigid like the seat frame. In certain aspects, the seat diaphragm 106 may be flexible relative to the seat frame 104. In one non-limiting example, the seat diaphragm 106 may be a flexible mesh back system. In FIGS. 1 and 2, the seat diaphragm 106 is shown as transparent such that the seat frame 104 and a rail assembly 114, which is discussed in detail below, can be seen. In certain embodiments, and as discussed below, one or more of the seat frame 104, the seat diaphragm 106, and/or the seat shell 110 may be a base structure that supports a rail assembly 114.

In certain embodiments, the passenger seat assembly 100 includes at least one rail assembly 114 that supports at least one movable assembly 116 on the passenger seat assembly 100. In the embodiment of FIGS. 1-4, the movable assembly 116 is a headrest 118. In other embodiments, the passenger seat assembly 100 may support additional and/or alternative movable assemblies 116 as desired, including but not limited to IFE screens, meal tables, combinations thereof, or other movable assemblies as desired. As one non-limiting example, FIGS. 5-8 illustrate an embodiment where the movable assembly 116 is an IFE screen 558.

Figure 4:
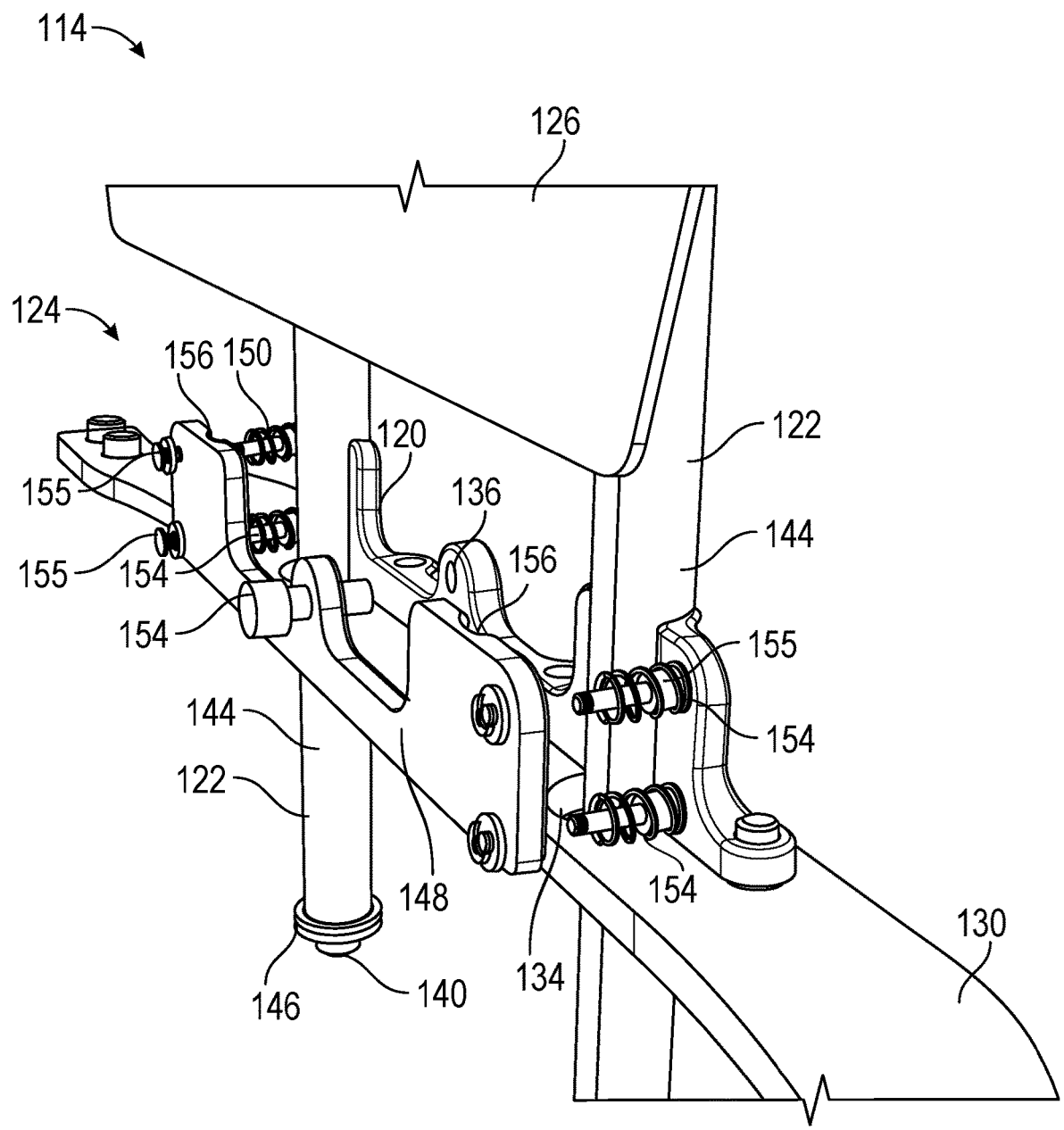
FIG. 4 is another perspective view of the rail assembly of FIG. 1.
Figure 5:
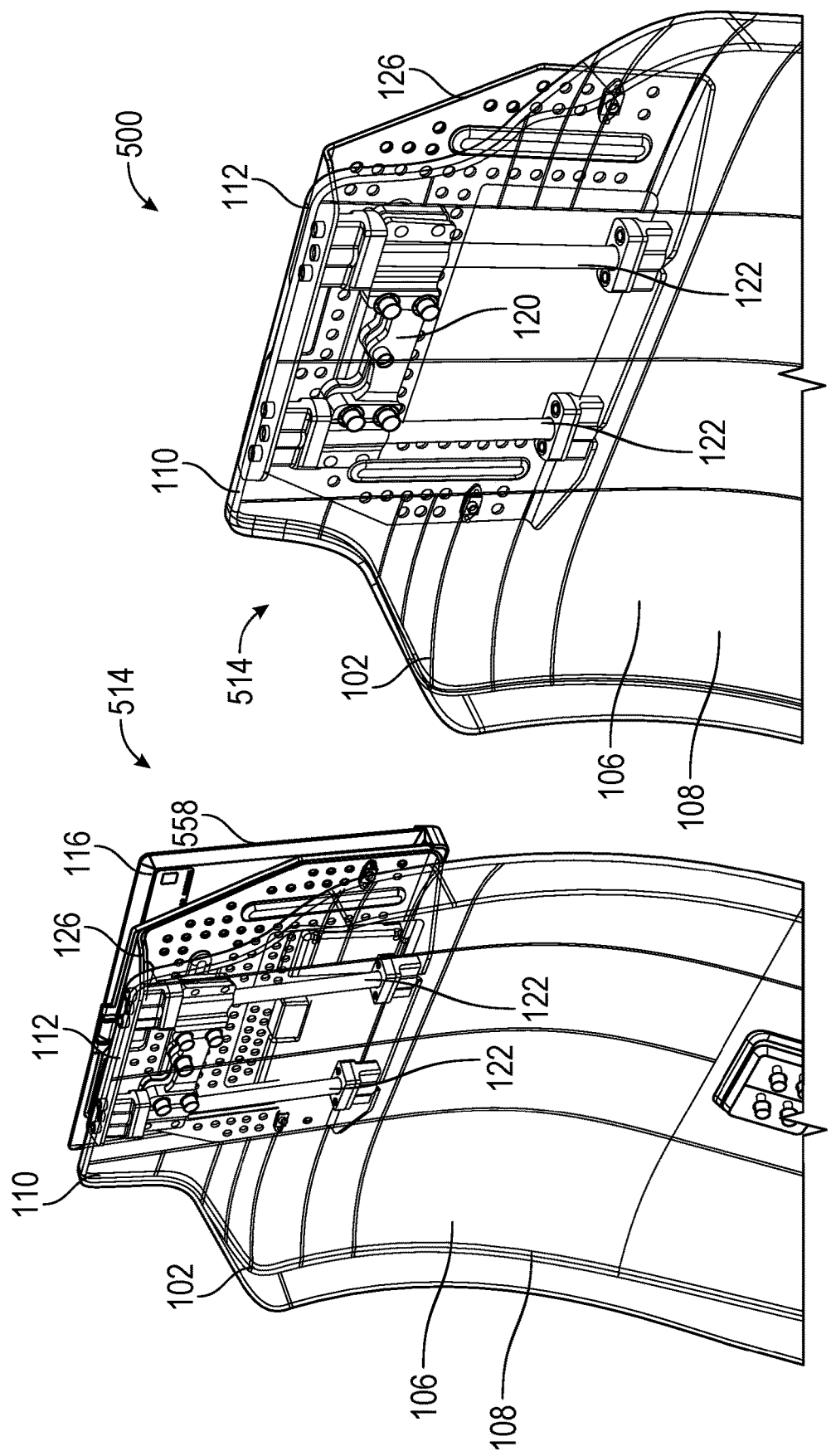
FIG. 5 is a perspective view of a portion of two passenger seat assemblies, each with a rail assembly according to certain embodiments of the present invention.
Figure 6:
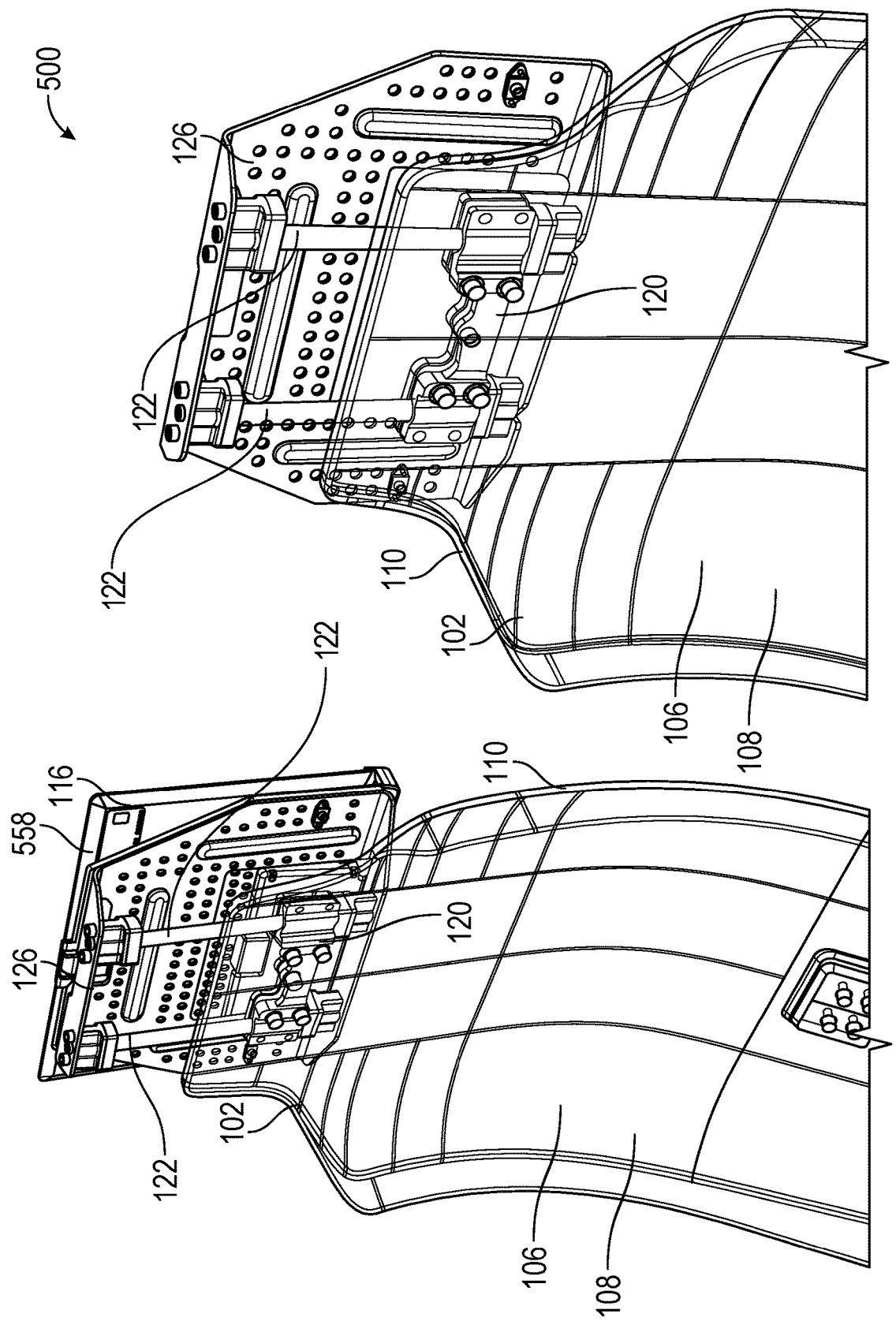
FIG. 6 is another perspective view of the passenger seat assemblies of FIG. 5 with the rail assemblies in a deployed position.
Figure 7:
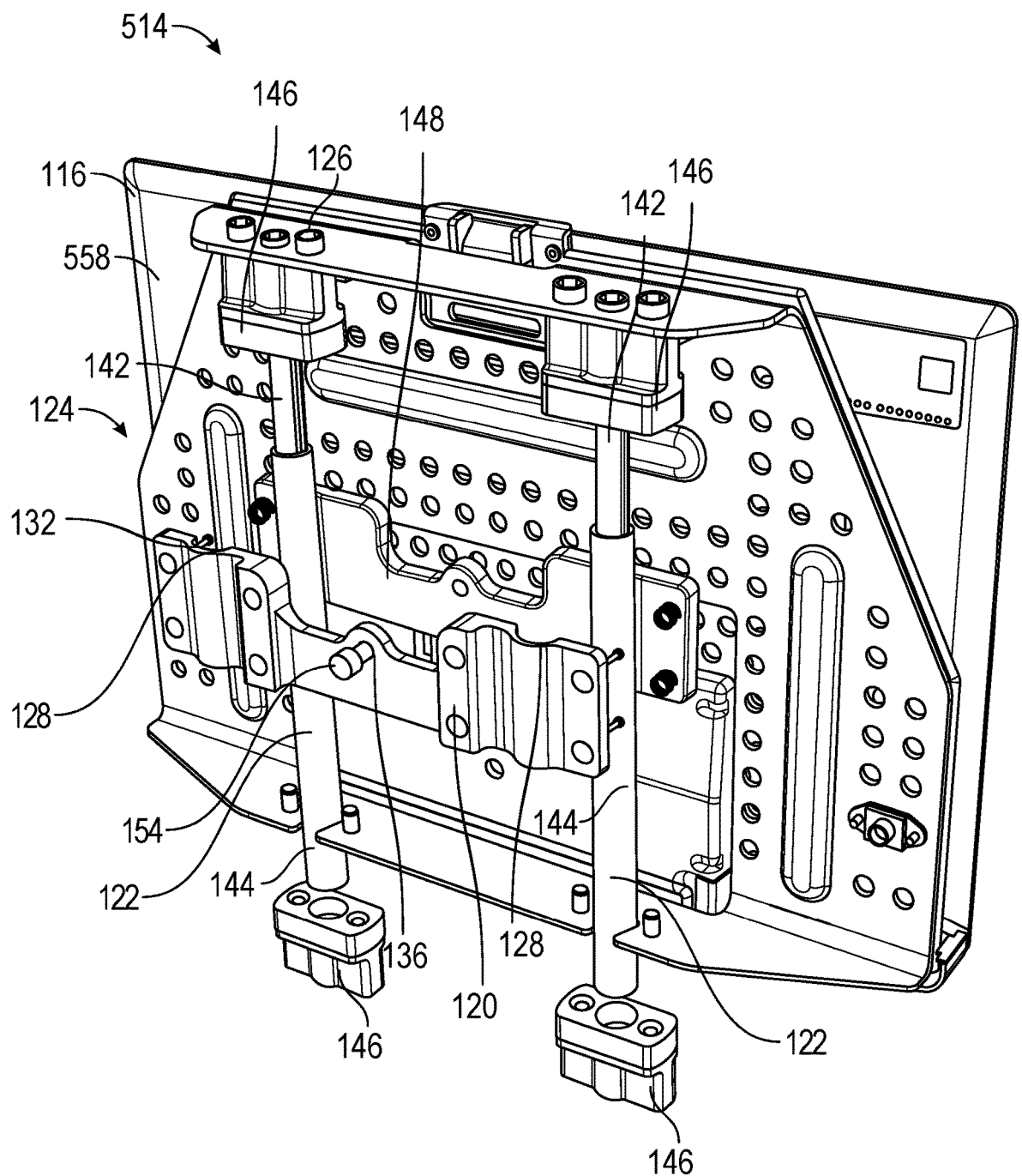
FIG. 7 is a perspective view of the rail assembly of FIG. 5.
Figure 8:
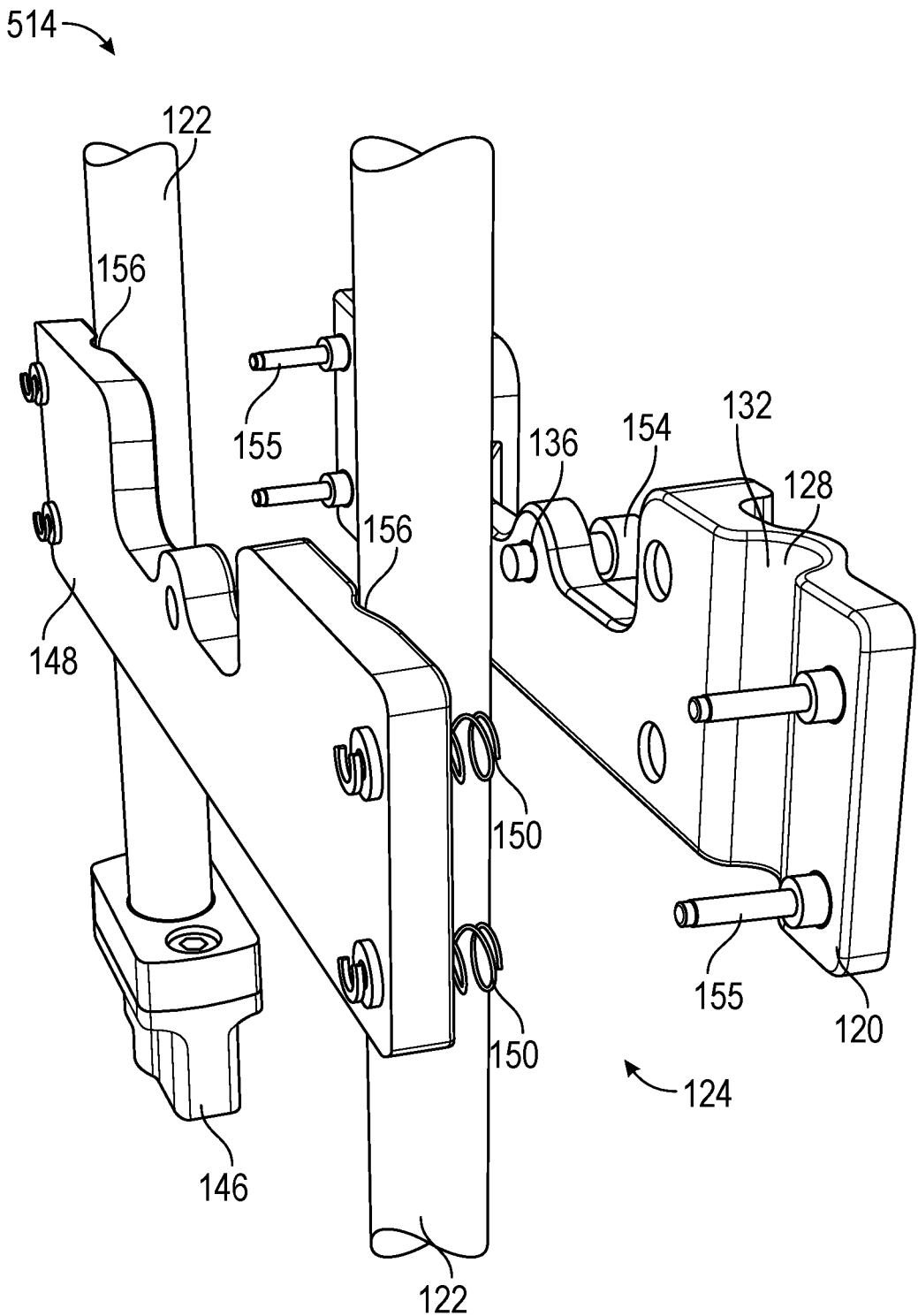
FIG. 8 is a perspective view of a portion of the rail assembly of FIG. 5.

As best illustrated in FIGS. 3 and 4, the rail assembly 114 includes a carriage 120, at least one rail 122, and a clamping system 124. Optionally, the rail assembly 114 includes a support 126 that is supported by the at least one rail 122 and that may define a mounting location for the movable assembly 116.

The carriage 120 of the rail assembly 114 may be supported on a base structure of the passenger seat assembly 100. As previously discussed, the base structure of the passenger seat assembly 100 may include, but is not limited to, the seat frame 104, the seat diaphragm 106, and/or the seat shell 110. In some embodiments, the carriage 120 optionally includes a carriage extension 130 that extends from the carriage 120. When the carriage extension 130 is included, the carriage extension 130 may be monolithically or integrally formed with the carriage 120 as a single component (e.g., via molding, casting, forming, or as otherwise desired), or the carriage extension 130 may be a separate component that is secured to the carriage 120 using various suitable mechanisms as desired, including but not limited to mechanical fasteners, adhesives or bonding agents, or other mechanisms as desired. In the embodiment of FIGS. 1-4, the carriage extension 130 is attached to the carriage 120 via mechanical fasteners. The particular shape of the carriage 120 and/or the carriage extension 130 should not be considered limiting. In other embodiments, the carriage extension 130 may be omitted.

In some embodiments, the carriage 120 may be supported on the base structure via the carriage extension 130, and in other embodiments, the carriage 120 may be directly supported on the base structure, and the carriage extension 130 may optionally be omitted. In the embodiment of FIGS. 1-4, the carriage 120 includes the carriage extension 130, and the carriage extension 130 is connected to the seat frame 104 via various suitable mechanisms including, but not limited to, mechanical fasteners and/or adhesives such that the carriage 120 is supported on the base structure via the carriage extension 130. In FIGS. 1-5, bolts 131 connect the carriage extension 130 to the seat frame 104. In the embodiment of FIGS. 5-8, the carriage extension 130 is omitted, and the carriage 120 is directly supported on and/or attached to the base structure.

The carriage 120 includes at least one receiving area 128 that selectively receives the at least one rail 122, and the at least one receiving area 128 defines an axis along which the at least one rail 122 is movable. In certain embodiments, the rail assembly 114 includes a plurality of rails 122 and the carriage 120 likewise includes a plurality of receiving areas 128. In some embodiments, and when included, and the carriage extension 130 and the carriage 120 may both define the receiving area(s) 128. As one non-limiting example, in FIGS. 1-4, each receiving area 128 includes groove 132 defined in the carriage 120 and an aperture 134 defined in the carriage extension 130. The receiving area(s) 128 may be various suitable features or devices for selectively receiving the at least one rail 122 and are not limited to the grooves 132 and apertures 134 illustrated in FIGS. 1-4. Moreover, the particular shape of the grooves 132 and/or apertures 134 should not be considered limiting.

In some cases, the carriage 120 includes a securing feature 136 that selectively engages a clamp adjuster 152 of the clamping system 124. In the embodiment of FIGS. 1-4, the securing feature 136 is a threaded aperture; however, various other devices or components may be utilized as the securing feature 136 to selectively engage the clamp adjuster 152. When the carriage 120 includes more than one receiving area 128, the securing feature 136 is optionally provided between adjacent receiving areas 128. As a non-limiting example, FIGS. 1-4 illustrate the carriage 120 with two receiving areas 128 and the securing feature 136 is between the receiving areas 128. In some cases, the securing feature 136 between adjacent receiving areas 128 may optionally allow a more uniform clamping force to be applied onto the rails in the receiving areas 128. However, in other embodiments, the securing feature 136 need not be between adjacent receiving areas 128. Moreover, in other embodiments, the carriage 120 may include more than one securing feature 136, and the plurality of securing features 136 may be provided at various locations as desired.

In certain embodiments, the carriage 120 may be constructed from a rigid material to support the bending loads of the rail(s) 122 as well as the weight of the movable assembly 116. In some non-limiting embodiments, the carriage 120 may be constructed from a metal material. Optionally, the geometry of the carriage 120 may provide increased support to the rail assembly 114 to support the bending loads and/or weight of the movable assembly 116.

As mention, the rail assembly 114 includes at least one rail 122, and in certain embodiments, the rail assembly 114 includes a plurality of rails 122. In the embodiment of FIGS. 1-4, the rail assembly 114 includes two rails 122. Each rail 122 includes a first end 138 and a second end 140 opposite from the first end 138. Each rail 122 is assembled with the carriage 120 such that a portion of the rail 122 between the first end 138 and the second end 140 is within a corresponding one of the receiving areas 128.

In some embodiments, and as best illustrated in FIG. 3, each rail 122 includes a reinforcement rail 142 and a sleeve 144 that surrounds the reinforcement rail 142. In some cases, the reinforcement rail 142 may provide stiffness and/or rigidity to the rail 122. Optionally, the reinforcement rail 142 may be constructed from a metal material. The sleeve 144 may substantially cover the reinforcement rail 142 at least in the receiving area 128 and may be provided to allow for smooth travel of the rail 122 relative to the carriage 120 and/or to minimize binding or other rates of wear on the rail 122. In some examples, the sleeve 144 may be constructed from a non-metal material to minimize a metal-to-metal interface (e.g., with the carriage 120). As one non-limiting example, the sleeve 144 may be a plastic material. In other embodiments, the sleeve 144 may be other materials as desired, including various metal materials.

In some embodiments, the support 126 is secured to the rail(s) 122. In the embodiment of FIGS. 1-4, the support 126 is secured to the rails 122 proximate to the first ends 138 and using mechanical fasteners. However, in other embodiments, the support 126 may be secured to the rails 122 at other locations as desired and/or using other mechanisms or devices as desired.

Optionally, each rail 122 may include one or more stops 146 on the rail 122. The stops may selectively engage the carriage 120 depending on a position of the rail 122 relative to the carriage 120 and may prevent movement of the rail 122 relative to the carriage 120 beyond the stops 146. The stops 146 may be constructed from various materials as desired. In some non-limiting embodiments, the stops 146 may be constructed from rubber. Moreover, different types of stops 146 (and/or differently shaped stops 146) may be provided on a single rail 122. In certain aspects, the one or more stops 146 may be proximate to the ends 138, 140 of the rails 122, although they need not be in other embodiments. The stops 146 may define a travel length for the rails 122 relative to the carriage 120 and may define a maximum height and a minimum height for the rails 122 relative to the carriage 120. As a non-limiting example, in FIGS. 1-4, the upper stops 146 (i.e., the stops 146 closest to the support 126) may contact and engage the carriage 120 when the rail assembly is in a stowed position (FIG. 1), and the lower stops 146 (i.e., the stops 146 furthest from the support 126) may contact and engage the carriage 120 when the rail assembly is in the deployed configuration (FIG. 2).

As best illustrated in FIGS. 3 and 4, the clamping system 124 includes a damper 148, at least one biasing member 150, and at least one clamp adjuster 152. As discussed in greater detail below, the clamping system 124 selectively clamps (e.g., frictionally engages) the rail(s) 122 in the receiving area(s) 128 of the carriage 120. The clamping provided by the clamping system 124 may allow for a controlled movement of the rail(s) 122 from the stowed position to the deployed position (or vice versa) and may optionally maintain a position of the rail(s) 122 relative to the carriage 120 at the stowed position, deployed position, or positions in between the stowed position and deployed position. In certain embodiments, the clamping on the rails 122 provided by the clamping system 124 may provide an even clamping force distribution across multiple rails 122. The clamping system 124 may also allow the clamping force to be adjusted with the tightening and loosening of the clamp adjuster 152.

The clamper 148 is attached to the carriage 120 such that the damper 148 at least partially overlaps the receiving area(s) 128 and such that at least a portion of the rail 122 is within a particular receiving area 128 between the clamper 148 and the carriage 120. Optionally, the damper 148 may include one or more damper grooves 156 and the damper 148 may selectively engage the rail 122 via the damper grooves 156. In other embodiments, the damper grooves 156 may be omitted. The particular shape of the damper 148 should not be considered limiting. The damper 148 may be attached to the carriage 120 via various suitable devices or mechanisms as desired. In the embodiment of FIGS. 1-4, the damper 148 is attached to the carriage 120 via guide pins 155.

The at least one biasing member 150 is provided between the carriage 120 and the damper 148 and biases the damper 148 away from the carriage 120. The number of biasing members 150 should not be considered limiting. In the embodiment of FIGS. 1-4, the rail assembly 114 includes four biasing members 150. The biasing member 150 may be various suitable devices for biasing the damper 148. In the embodiment of FIGS. 1-4, the biasing members 150 are compression springs. Optionally, the biasing members 150 are assembled such that the receiving area(s) 128 are between the biasing members 150; however, in other embodiments, the biasing members 150 may be at other locations as desired.

The clamp adjuster 152 connects the damper 148 with the carriage 120 (e.g., via the securing feature 136) and may define a maximum distance that biasing members 150 can bias the damper 148 away from the carriage 120. In some examples, the clamp adjuster 152 may be an adjustment screw, although in other embodiments the clamp adjuster 152 may be various suitable devices or components as desired. In various embodiments, the clamp adjuster 152 may be provided between adjacent receiving areas 128, although it need not be in other embodiments. In further embodiments, a plurality of clamp adjusters 152 may be provided at various locations as desired.

The distance between the damper 148 and the carriage 120 may control the amount of contact and/or frictional engagement between the rails 122 in the receiving areas 128 and the damper 148 and carriage 120. In certain aspects, the clamp adjuster 152 is adjustable such that the maximum distance between the damper 148 and the carriage 120 is adjustable, and as such, that amount of contact and/or friction is adjustable. In various embodiments, the clamp adjuster 152 may allow the frictional engagement between the rails 122 and the clamper 148 and the carriage 120 to be tailored for particular applications. As some non-limiting examples, the clamp adjuster 152 may be controlled such that there is less frictional engagement with the rails 122 when the rail assembly 114 supports a movable assembly 116 such as the headrest 118 and such that there is more frictional engagement with the rails 122 when the rail assembly 114 supports a movable assembly 116 such as the IFE screen 558.

FIGS. 5-8 illustrate another embodiment of a passenger seat assembly 500 with a rail assembly 514. The passenger seat assembly 500 and the rail assembly 514 are similar to the passenger seat assembly 100 and the rail assembly 114 except as noted below. In one aspect, compared to the passenger seat assembly 100, the passenger seat assembly 500 includes two seat backs 102, each of which includes a rail assembly 514. Compared to the passenger seat assembly 100, the base structure of the passenger seat assembly 500 is the seat shell 110 (i.e., the rail assembly 514 is supported on the seat shell 110 rather than the frame as in the passenger seat assembly 100. In addition, compared to the passenger seat assembly 100, the movable assembly 116 of the passenger seat assembly 500 is the IFE screen 558. In this embodiment, because the rail assembly 514 is configured to support the IFE screen 558, the support 126 of the rail assembly 514 has a different shape compared to the rail assembly 114. Lastly, as illustrate in FIG. 6 for example, the rail assembly 514 omits the carriage extension 130, and the carriage 120 is directly attached and/or otherwise supported on the base structure (e.g., the seat shell 110).

A method of operating the rail assemblies described herein may include assembling the carriages of the rail assemblies with base structures such that the carriages are supported on the base structures. The method may include assembling the rail(s) with the carriages such that the rails are at least partially positioned in the receiving areas of the carriages. In certain embodiments, the method may include assembling the clamping system with the carriage such that the damper of the clamping system at least partially overlaps the rails in the receiving areas. The method may include adjusting the clamping force applied on the rails in the receiving area by adjusting the clamp adjuster to increase or decrease the distance between the damper and the carriage. In certain embodiments, the method may include moving the rails within the receiving areas along the length of the rails (optionally between stoppers on the rails) to control a height of the movable assembly supported by the rail assembly.

A collection of exemplary embodiments are provided below, including at least some explicitly enumerated as "Examples" providing additional description of a variety of example embodiments in accordance with the concepts described herein. These examples are not meant to be mutually exclusive, exhaustive, or restrictive; and the disclosure not limited to these examples but rather encompasses all possible modifications and variations within the scope of the issued claims and their equivalents.

Example 1. A passenger seat assembly comprising: a movable assembly; and a rail assembly comprising: a fixed carriage defining a receiving area; a rail at least partially supported within the receiving area, wherein the rail is slidable along an axis relative to the receiving area; and a clamping system configured to apply a clamping force on the rail within the receiving area, wherein the movable assembly is supported on the rail such that the movable assembly is movable along the axis relative to the fixed carriage.

Example 2. The passenger seat assembly of any of the preceding or subsequent examples or combination of examples, wherein the movable assembly comprises a headrest or an in-flight entertainment system support.

Example 3. The passenger seat assembly of any of the preceding or subsequent examples or combination of examples, wherein the clamping system comprises: a damper at least partially covering the receiving area of the fixed carriage; and at least one biasing mechanism between the damper and the fixed carriage and biasing the damper away from the fixed carriage.

Example 4. The passenger seat assembly of any of the preceding or subsequent examples or combination of examples, wherein the clamping system further comprises: a damper at least partially covering the receiving area of the fixed carriage; and a clamp adjuster connecting the clamper with the fixed carriage, wherein the clamp adjuster is adjustable such that the clamping force is adjustable.

Example 5. The passenger seat assembly of any of the preceding or subsequent examples or combination of examples, wherein the receiving area is a first receiving area and the rail is a first rail, wherein the fixed carriage comprises a second receiving area, wherein the rail assembly further comprises a second rail partially supported within the second receiving area and slidable along an axis relative to the second receiving area, and wherein the damper at least partially covers the first rail in the first receiving area and the second rail in the second receiving area.

Example 6. The passenger seat assembly of any of the preceding or subsequent examples or combination of examples, wherein the clamp adjuster is between the first receiving area and the second receiving area.

Example 7. The passenger seat assembly of any of the preceding or subsequent examples or combination of examples, wherein the rail comprises a reinforcement rail and a sleeve surrounding the reinforcement rail, and wherein the clamping system is configured to engage the sleeve.

Example 8. The passenger seat assembly of any of the preceding or subsequent examples or combination of examples, wherein the rail assembly further comprises stops on opposing ends of the rail.

Example 9. A passenger seat assembly comprising: a base structure; and a rail assembly comprising: a carriage fixed to the base structure and defining a receiving area; a rail comprising a first end and a second end opposite from the first end, wherein at least a portion of the rail between the first end and the second end is within the receiving area, wherein the rail is movable along an axis of the receiving area such that a position of the first end and the second end along the axis and relative to the carriage is adjustable; and a clamping system configured to apply a clamping force on the portion of the rail within the receiving area.

Example 10. The passenger seat assembly of any of the preceding or subsequent examples or combination of examples, wherein the base structure comprises at least one of a seat diaphragm, a seat shell, or a seat frame.

Example 11. The passenger seat assembly o of any of the preceding or subsequent examples or combination of examples, further comprising a movable assembly supported by the rail of the rail assembly, wherein the movable assembly comprises at least one of a headrest or an in-flight entertainment system support.

Example 12. The passenger seat assembly of any of the preceding or subsequent examples or combination of examples, wherein the receiving area is a first receiving area and the rail is a first rail, and wherein the rail assembly further comprises: a second receiving area defined by the carriage; and a second rail comprising a first end and a second end opposite from the first end, wherein at least a portion of the second rail between the first end and the second end is within the second receiving area, wherein the second rail is movable along an axis of the receiving area such that a position of the first end and the second end along the axis and relative to the carriage is adjustable, and wherein the clamping system is configured to apply a clamping force on the portion of the second rail within the second receiving area.

Example 13. The passenger seat assembly of any of the preceding or subsequent examples or combination of examples, further comprising: a clamper at least partially covering the first receiving area and the second receiving area; and a clamp adjuster connecting the damper with the carriage between the first receiving area and the second receiving area, wherein the clamp adjuster is adjustable such that the clamping force is adjustable.

Example 14. The passenger seat assembly of any of the preceding or subsequent examples or combination of examples, wherein the clamping system further comprises: a damper at least partially covering the receiving area of the carriage; a biasing member between the damper and the carriage; and a clamp adjuster connecting the damper with the carriage, wherein the clamp adjuster is adjustable such that the clamping force is adjustable.

Example 15. A passenger seat assembly comprising a rail assembly configured to move a movable assembly relative to a base structure, wherein the rail assembly comprises: a carriage defining a receiving area; a rail comprising a first end and a second end opposite from the first end, wherein at least a portion of the rail between the first end and the second end is within the receiving area, wherein the rail is movable along an axis of the receiving area such that a position of the first end and the second end along the axis and relative to the carriage is adjustable; and a clamping system configured to apply a clamping force on the portion of the rail within the receiving area, wherein the clamping system comprises: a damper at least partially covering the rail in the receiving area; and a clamp adjuster connecting the damper with the carriage, wherein the clamp adjuster is adjustable such that the clamping force is adjustable.

Example 16. The passenger seat assembly of any of the preceding or subsequent examples or combination of examples, further comprising the base structure and the movable assembly, wherein the carriage is fixed on the base structure, wherein the rail supports the movable assembly such that the movable assembly is movable relative to the base structure, wherein the base structure comprises at least one of a seat diaphragm, a seat shell, or a seat frame, and wherein the movable assembly comprises at least one of a headrest or an in-flight entertainment system support.

Example 17. The passenger seat assembly of any of the preceding or subsequent examples or combination of examples, wherein the rail assembly further comprises at least one biasing member between the clamper and the carriage that biases the damper away from the carriage.

Example 18. The passenger seat assembly of any of the preceding or subsequent examples or combination of examples, wherein the receiving area is a first receiving area and the rail is a first rail, and wherein the rail assembly further comprises: a second receiving area defined by the carriage; and a second rail comprising a first end and a second end opposite from the first end, wherein at least a portion of the second rail between the first end and the second end is within the second receiving area, wherein the second rail is movable along an axis of the receiving area such that a position of the first end and the second end along the axis and relative to the carriage is adjustable, and wherein the clamping system is configured to apply a clamping force on the portion of the second rail within the second receiving area.

Example 19. The passenger seat assembly of any of the preceding or subsequent examples or combination of examples, wherein the clamp adjuster is between the first receiving area and the second receiving area.

Example 20. The passenger seat assembly of any of the preceding or subsequent examples or combination of examples, wherein the rail comprises a reinforcement rail and a sleeve surrounding the reinforcement rail, and wherein the clamping system is configured to engage the sleeve.

Different arrangements of the components depicted in the drawings or described above, as well as components and steps not shown or described are possible. Similarly, some features and sub-combinations are useful and may be employed without reference to other features and sub-combinations. Embodiments of the invention have been described for illustrative and not restrictive purposes, and alternative embodiments will become apparent to readers of this patent. Accordingly, the present invention is not limited to the embodiments described above or depicted in the drawings, and various embodiments and modifications may be made without departing from the scope of the claims below.

That which is claimed is:

1. A passenger seat assembly comprising:
   a movable assembly comprising a headrest or an in-flight entertainment system; and
   a rail assembly for supporting the movable assembly on a seat back, the rail assembly comprising:
      a fixed carriage defining a receiving area, the fixed carriage for supporting the rail assembly on the seat back, the receiving area comprising a groove defined in the carriage and an aperture;
      a rail at least partially supported within the receiving area and within the groove and the aperture, wherein the rail is slidable along an axis relative to the receiving area along the groove and through the aperture; and
      a clamping system configured to apply a clamping force on the rail within the receiving area,
      wherein the movable assembly is supported on the rail such that the movable assembly is movable along the axis relative to the fixed carriage.

2. The passenger seat assembly of claim 1, wherein the clamping system comprises:
   a clamper at least partially covering the receiving area of the fixed carriage; and
   at least one biasing mechanism between the clamper and the fixed carriage and biasing the clamper away from the fixed carriage.

3. The passenger seat assembly of claim 1, wherein the clamping system further comprises:
   a clamper at least partially covering the receiving area of the fixed carriage; and
   a clamp adjuster connecting the clamper with the fixed carriage, wherein the clamp adjuster is adjustable such that the clamping force is adjustable.

4. The passenger seat assembly of claim 3, wherein the receiving area is a first receiving area and the rail is a first rail, wherein the fixed carriage comprises a second receiving area, wherein the rail assembly further comprises a second rail partially supported within the second receiving area and slidable along an axis relative to the second receiving area, and wherein the clamper at least partially covers the first rail in the first receiving area and the second rail in the second receiving area.

5. The passenger seat assembly of claim 4, wherein the clamp adjuster is between the first receiving area and the second receiving area.

6. The passenger seat assembly of claim 1, wherein the rail comprises a reinforcement rail and a sleeve surrounding the reinforcement rail, and wherein the clamping system is configured to engage the sleeve.

7. The passenger seat assembly of claim 1, wherein the rail assembly further comprises stops on opposing ends of the rail.

8. A passenger seat assembly comprising:
   a base structure comprising a seat back; and
   a rail assembly supported on the seat back, the rail assembly comprising:
      a carriage fixed to the seat back and defining a receiving area comprising an aperture and a groove, the aperture defining an axis, and the groove elongated along the axis;
      a rail comprising a first end and a second end opposite from the first end, wherein at least a portion of the rail between the first end and the second end is within the receiving area within the groove and extending through the aperture, wherein the rail is movable along the axis of the receiving area such that a position of the first end and the second end along the axis and relative to the carriage is adjustable; and a clamping system configured to apply a clamping force on the portion of the rail within the receiving area.

9. The passenger seat assembly of claim 8, further comprising a movable assembly supported by the rail of the rail assembly, wherein the movable assembly comprises at least one of a headrest or an in-flight entertainment system support.

10. The passenger seat assembly of claim 8, wherein the receiving area is a first receiving area and the rail is a first rail, and wherein the rail assembly further comprises:
 a second receiving area defined by the carriage; and
 a second rail comprising a first end and a second end opposite from the first end,
 wherein at least a portion of the second rail between the first end and the second end is within the second receiving area,
 wherein the second rail is movable along an axis of the receiving area such that a position of the first end and the second end along the axis and relative to the carriage is adjustable, and
 wherein the clamping system is configured to apply a clamping force on the portion of the second rail within the second receiving area.

11. The passenger seat assembly of claim 10, further comprising:
 a clamper at least partially covering the first receiving area and the second receiving area; and
 a clamp adjuster connecting the clamper with the carriage between the first receiving area and the second receiving area, wherein the clamp adjuster is adjustable such that the clamping force is adjustable.

12. The passenger seat assembly of claim 8, wherein the clamping system further comprises:
 a clamper at least partially covering the receiving area of the carriage;
 a biasing member between the clamper and the carriage; and
 a clamp adjuster connecting the clamper with the carriage, wherein the clamp adjuster is adjustable such that the clamping force is adjustable.

13. A passenger seat assembly comprising a rail assembly configured to move a movable assembly relative to a seat back, wherein the rail assembly comprises:
 a carriage defining a receiving area and for supporting the rail assembly on the seat back, the receiving area comprising an aperture and a groove, the aperture defining an axis, and the groove elongated along the axis;
 a rail comprising a first end and a second end opposite from the first end, wherein at least a portion of the rail between the first end and the second end is within the receiving area within the groove and through the aperture, wherein the rail is movable along the axis of the receiving area such that a position of the first end and the second end along the axis and relative to the carriage is adjustable; and
 a clamping system configured to apply a clamping force on the portion of the rail within the receiving area, wherein the clamping system comprises:
  a clamper at least partially covering the rail in the receiving area and applying the clamping force on the portion of the rail to clamp the portion of the rail with the groove; and
  a clamp adjuster connecting the clamper with the carriage, wherein the clamp adjuster is adjustable such that the clamping force is adjustable.

14. The passenger seat assembly of claim 13, further comprising a base structure and the movable assembly, wherein the carriage is fixed on the base structure, wherein the rail supports the movable assembly such that the movable assembly is movable relative to the base structure, wherein the base structure comprises at least one of a seat diaphragm, a seat shell, or a seat frame, and wherein the movable assembly comprises at least one of a headrest or an in-flight entertainment system support.

15. The passenger seat assembly of claim 13, wherein the rail assembly further comprises at least one biasing member between the clamper and the carriage that biases the clamper away from the carriage.

16. The passenger seat assembly of claim 13, wherein the receiving area is a first receiving area and the rail is a first rail, and wherein the rail assembly further comprises:
 a second receiving area defined by the carriage; and
 a second rail comprising a first end and a second end opposite from the first end,
 wherein at least a portion of the second rail between the first end and the second end is within the second receiving area,
 wherein the second rail is movable along an axis of the receiving area such that a position of the first end and the second end along the axis and relative to the carriage is adjustable, and
 wherein the clamping system is configured to apply a clamping force on the portion of the second rail within the second receiving area.

17. The passenger seat assembly of claim 16, wherein the clamp adjuster is between the first receiving area and the second receiving area.

18. The passenger seat assembly of claim 13, wherein the rail comprises a reinforcement rail and a sleeve surrounding the reinforcement rail, and wherein the clamping system is configured to engage the sleeve.

* * * * *